(12) United States Patent  (10) Patent No.: US 7,922,131 B2
Hamilton  (45) Date of Patent: Apr. 12, 2011

(54) APPARATUS FOR SECURING ITEMS TO A MICROPHONE STAND

(76) Inventor: Steven D Hamilton, Greenfield, WI (US)

( * ) Notice: Subject to any disclaimer, the term of this patent is extended or adjusted under 35 U.S.C. 154(b) by 0 days.

(21) Appl. No.: 12/456,819

(22) Filed: Jun. 23, 2009

(65) Prior Publication Data

US 2010/0116948 A1    May 13, 2010

Related U.S. Application Data

(60) Provisional application No. 61/132,870, filed on Jun. 23, 2008.

(51) Int. Cl.
*F16L 3/00* (2006.01)

(52) U.S. Cl. .......... 248/121; 248/213.2; 248/213.4; 248/229.15; 248/127; 248/907

(58) Field of Classification Search .......... 248/121, 248/213.2, 213.4, 229.15, 127, 907, 210
See application file for complete search history.

(56) References Cited

U.S. PATENT DOCUMENTS

| | | | | |
|---|---|---|---|---|
| D395,895 S | * | 7/1998 | Flinn | D14/229 |
| D487,862 S | * | 3/2004 | Tincher | D7/620 |
| 2004/0222345 A1 | * | 11/2004 | Lindsay | 248/311.2 |

* cited by examiner

*Primary Examiner* — Terrell Mckinnon
*Assistant Examiner* — Erin Smith
(74) *Attorney, Agent, or Firm* — Ryan Kromholz & Manion, S.C.

(57) ABSTRACT

A device according to the present invention includes a support bracket coupled, or adapted to be coupled, to a longitudinal support member, such as a microphone stand, and a receiver extending from the support bracket. The support bracket is generally formed in a coil. The receiver may be integrally formed with the support bracket, or may be removably coupled thereto. A plurality of interchangeable receivers may also be provided.

4 Claims, 4 Drawing Sheets

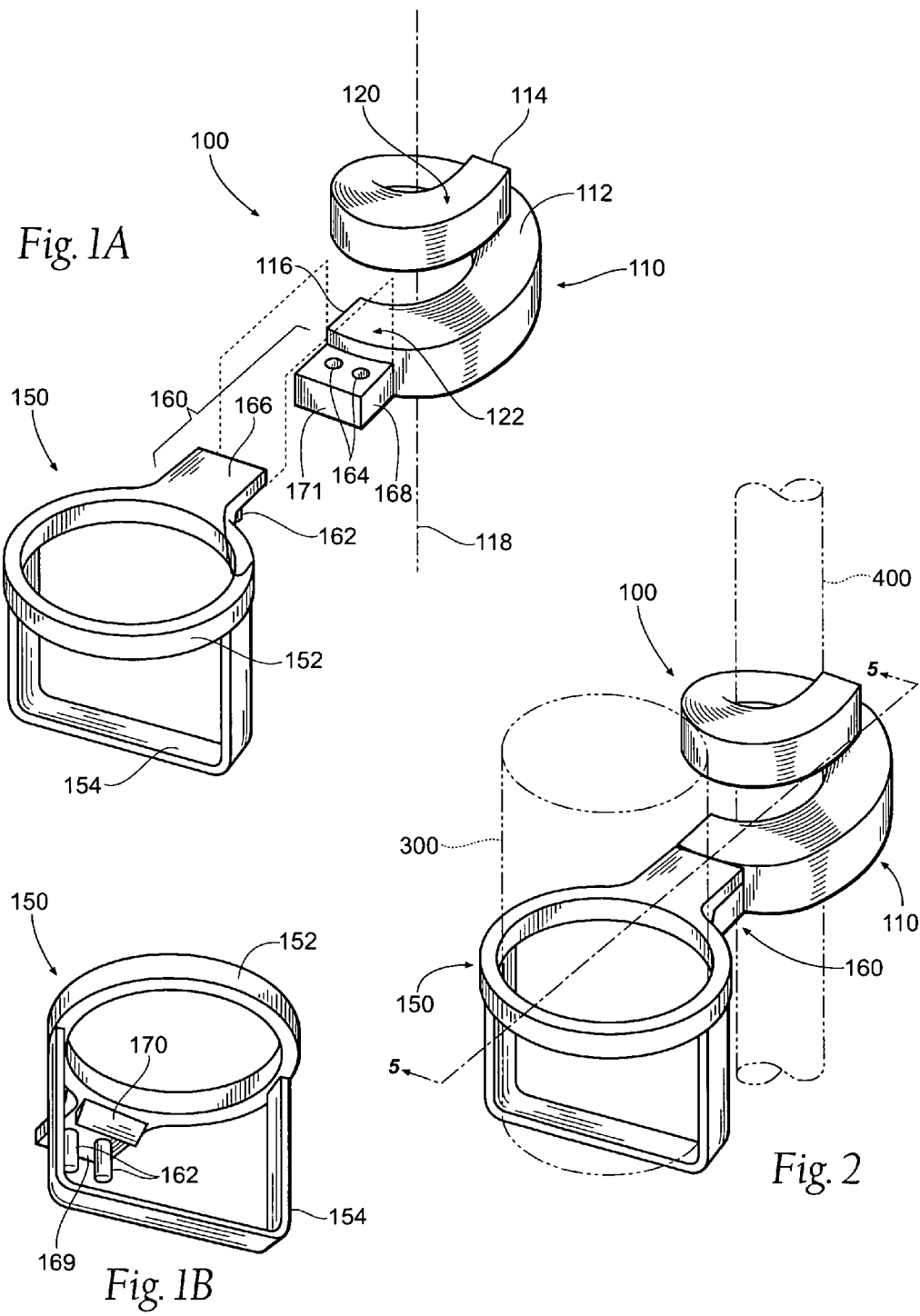

000000000000000000000000000000000000000000000000000
APPARATUS FOR SECURING ITEMS TO A MICROPHONE STAND

RELATED APPLICATIONS

This application claims the benefit of U.S. Provisional Patent Application Ser. No. 61/132,870, filed 23 Jun. 2008 and entitled "Apparatus for Securing Items to a Microphone Stand."

BACKGROUND OF THE INVENTION

An apparatus according to the present invention is related generally to supportive structures, and more particularly to an apparatus for securing or supporting various items to or on a microphone stand.

It is often desirable to support various items near the user of a microphone. A variety of support devices have been developed. For instance, clamping mechanisms have been used to securely fasten items, such as pop filters or windscreens, to a microphone stand. Furthermore, longitudinal sleeves have been formed to snap onto a microphone stand to provide a docking slot for guitar picks.

While prior devices have shown useful for particular applications, there are at least two downfalls with prior methods and apparatus for securing items to a microphone stand. First, some clamping mechanisms utilize threaded positioning devices, such as a set screw, to frictionally engage the microphone stand. As a result, adjustment of the clamp positioning on the microphone stand requires loosening of the set screw, repositioning of the clamp, and retightening of the set screw. The adjustment may be complicated if the set screw does not have a handle, but rather requires a tool to loosen. Additionally, the set screw may damage the microphone stand. The second downfall to prior devices, such as longitudinal sleeve devices, is that such prior devices were generally specifically designed to provide a singular function once the device was coupled to a microphone stand. While generally providing adequate functionality for its intended purpose, such device may limit the adjustability of the microphone stand and does not address the securing of other desirable items to the stand.

Therefore, the art of supporting items proximate to or on a microphone stand would benefit from a device that provides ease in adjustment of positioning the device relative to a microphone stand, a device that does not damage the microphone stand, and a device that may include interchangeable attachments, thereby enabling the support of desired objects.

SUMMARY OF THE INVENTION

An apparatus according to the present invention includes a device that provides ease in adjustment of positioning the device relative to a microphone stand, a device that does not damage the microphone stand, and a device that may include interchangeable attachments, thereby enabling the support of desired objects.

A device according to the present invention includes a support bracket and a receiver coupled to the support bracket. The support bracket includes a longitudinal frame member, which may be solid or hollow, extending between a first end and a second end. The longitudinal frame member is formed in a general coil shape around an axis. A first frame portion extends from the first end of the frame member towards the second end, and a second frame portion extends from the second end towards the first end. The first frame portion overlies the second frame portion, and may be spaced therefrom by an insertion gap distance at some point along the first frame portion. The receiver is coupled to the support bracket, extending away from the axis.

In one embodiment, the longitudinal frame member has a generally rectangular cross-section.

In one embodiment, the receiver is coupled to the support bracket by being integrally formed therewith. In another embodiment, the receiver is removably coupled to the support bracket. The receiver may be removably coupled to the support bracket by a receiver hitch. The receiver hitch may include at least one hitch peg, and at least one hitch aperture, at least one of the at least one hitch peg being matable with at least one of the at least one hitch aperture to couple the receiver to the support bracket. A hitch peg may be provided as extending from the receiver and a mateable hitch aperture may be formed in the support bracket.

In one embodiment, a second receiver is provided, which is interchangeably removably coupleable to said support bracket.

In one embodiment, the support bracket and/or the receiver is formed as a unitary member. In another embodiment, the entire device is formed as a unitary member.

In one embodiment, the device further includes an opening formed about the axis. In a further embodiment, the opening is generally circular in shape and has a diameter. In still another embodiment, the insert gap distance is smaller than the diameter of the opening. In yet another embodiment, the insert gap distance falls within a range of the diameter of the opening plus or minus twenty percent, and may be substantially equal to the diameter of the opening.

Another device according to the present invention includes a microphone stand and a device comprising a support bracket supported on the microphone stand, where the support bracket includes a longitudinal frame member extending between a first end and a second end, and the frame member is formed in a general coil shape around an axis. The longitudinal frame member includes a first frame portion extending from the first end towards the second end and also includes a second frame portion extending from the second end towards the first end. The first frame portion overlies the second frame portion, and the first frame portion is spaced from the second frame portion by an insertion gap distance at a point along the first frame portion.

In one embodiment, device of the combination further includes a receiver coupled to the support bracket, extending away from the axis.

In one embodiment, the support bracket is frictionally supported on the microphone stand.

BRIEF DESCRIPTION OF THE DRAWINGS

FIG. 1A is a perspective assembly view of a first embodiment of an apparatus for securing items to a microphone stand according to the present invention.

FIG. 1B is a perspective view of a first embodiment of a receiver according to the present invention.

FIG. 2 is a perspective view of the first embodiment of FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 3:
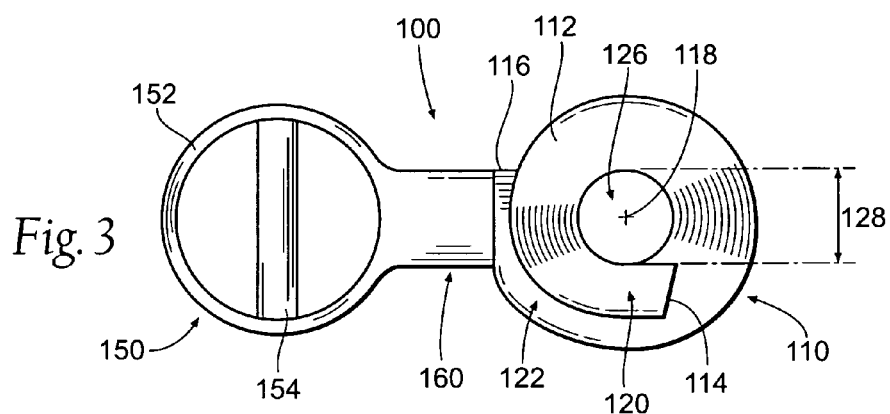
FIG. 3 is a top plan view of the embodiment of FIG. 1.
Figure 5:
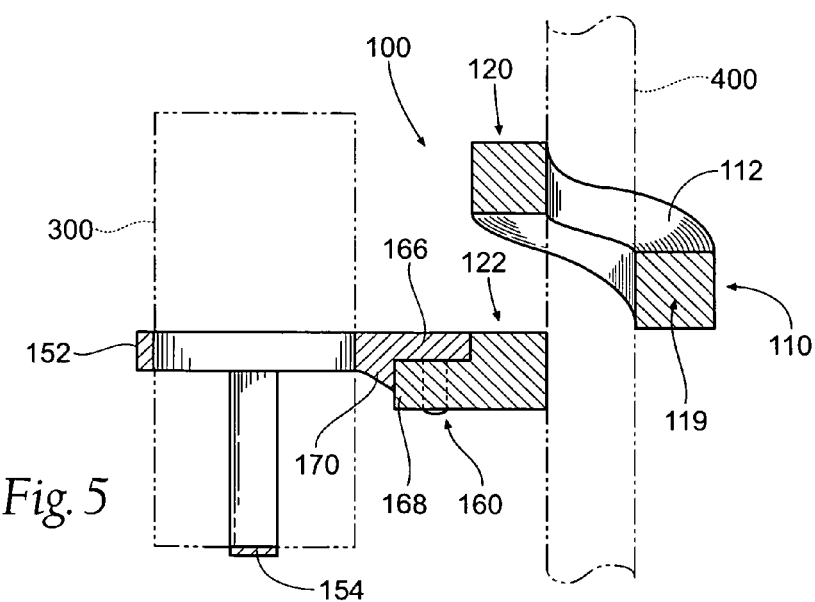
FIG. 5 is a cross-sectional view taken along line 5-5 of FIG. 2.

Turning now to the figures, FIG. 1A depicts an embodiment 100 of a device according to the present invention. Generally, such device 100 includes a support bracket 110 and a receiver 150. The support bracket 110 includes a longitudinal frame member 112 extending between a first end 114 and a second end 116. The frame member 112 is preferably formed in a general coil shape about an axis 118. While the frame member 112 may be hollow, the frame member 112 is preferably a solid member having a desired cross-sectional shape, such as a rectangular cross-section 119, as shown in FIG. 5. The frame member 112 includes a first frame portion 120 that extends from the first end 114 towards the second end 116. The frame member 112 also includes a second frame portion 122, which extends from the second end 116 towards the first end 114. The first frame portion 120 overlies the second frame portion 122, and the first frame portion 120 may be narrower than the second frame portion 122. While the first frame portion 120 may rest generally adjacent the second frame portion 122, at least part of the first frame portion 120 is preferably spaced from the second frame portion 122 by an insertion gap distance 124. As seen in FIG. 3, the support bracket 110 may also include an opening 126 formed about the axis 118. The opening 126, if provided, may generally be of any desired shape, such as the generally circular opening 126 seen in FIG. 3. If the opening 126 is not provided, the longitudinal frame member 112 is tightly coiled about the axis 118. The insertion gap distance 124 may be related to the size of the opening 126. For instance, if the opening provided is a circular opening 126, the insertion gap distance 124 may be associated with the diameter 128 of the opening 126. For instance, the insertion gap 124 may fall in the range of the opening diameter 128 plus or minus twenty percent. In this manner, as the support bracket 110 is rotated such that the axis 118 is substantially perpendicular to a microphone stand 400, the microphone stand 400 may be allowed to travel between the first frame portion 120 and the second frame portion 122 relatively easily prior to the bracket 110 being rotated in the opposite direction, situating the axis 118 in at least a substantially parallel relationship to a central axis of the microphone stand 400.

Extending from the support bracket 110, away from the frame member axis 118, is the receiver 150. The receiver 150 is a portion of the embodiment 100 that receives or holds something. FIG. 1B depicts a first embodiment 150 of a receiver according to the present invention. This embodiment 150 includes a support collar 152 and a support strap 154 depending from the support collar 152. The receiver 150 is adapted to receive or hold an article, such as a beverage container 300 shown in FIG. 2, within the support collar 152 and atop the support strap 154. The support collar 152 thus prevents tipping and the support strap 154 may support a majority of the weight of the article 300. While the support collar 152 may be formed generally in any shape, the preferred collar shape is generally circular, as shown in the top plan view of FIG. 3. The size of the collar 152 may be tailored to a particular application, such as approximating the size of an average twelve-ounce beverage can.

Either receiver 150 or 250 may be integrally formed and coupled with the support bracket 110 or may be provided as a separate unit, removably coupled to the support bracket 110, as shown. To removably couple the receiver 150 to the support bracket 110, a receiver hitch mechanism 160 may be used. The receiver hitch 160 may include at least one hitch peg 162 and at least one hitch aperture 164 to cooperate with at least one of the at least one hitch peg 162. While the at least one hitch peg 162 and at least one hitch aperture 164 may be arranged in a variety of orientations, at least one of the at least one hitch peg 162 is preferably supported on the receiver 150 by a receiver hitch tab 166. Further, at least one of the at least one hitch aperture 164 is preferably formed in a hitch tongue 168 supported on, and preferably formed integrally with, the support bracket 110. The receiver 150 may also be provided with a receiver wedge 170 provided on a bottom surface 169 of the receiver tab 166 and/or support collar 152. The receiver wedge 168 preferably provides support reinforcement by cooperating with a surface 171 of the hitch tongue 168.

Figure 6:
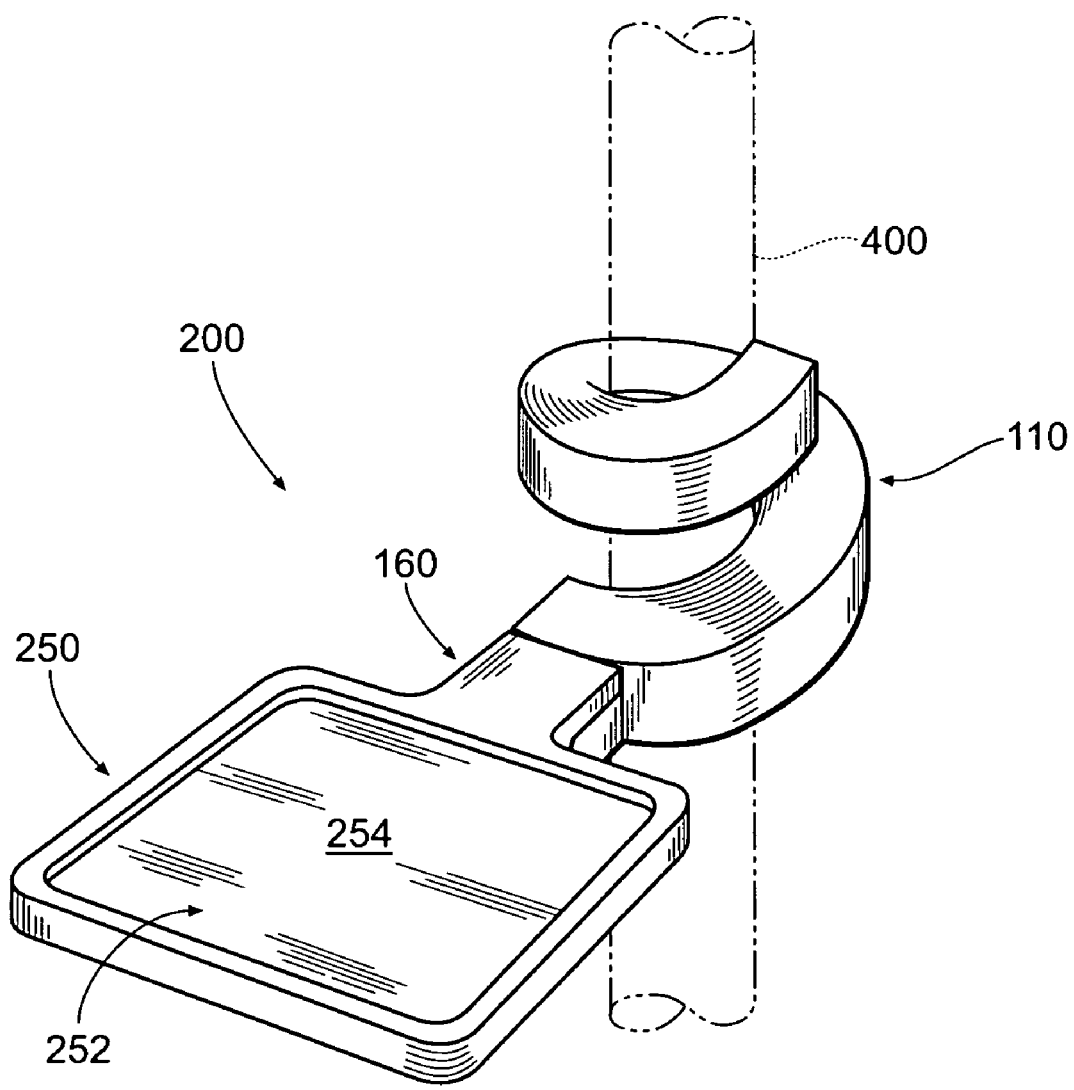
FIG. 6 is a perspective view of a second embodiment of an apparatus for securing items to a microphone stand according to the present invention.

A second embodiment 200 of a device according to the present invention is shown in FIG. 6. This embodiment 200 may use the same support bracket 110 as was used in the first embodiment 100, but may provide a different receiver 250, that is interchangeable with the first 150. The second receiver 250 generally includes a top support surface 252 having a preferably recessed portion 254, which may be generally planar. Such receiver 250 is thus adapted to hold a variety of items, such as guitar picks, an ashtray, or a beverage container, for examples. The second receiver 250 is coupled to the support bracket 110 in preferably the same manner as the first 150, either by being integrally formed therewith or by use of a hitch 160.

A device according to the present invention may be formed of any material suitable for a desired amount of support of an article on a microphone stand. The device, or its various components, may be injection molded of a suitable plastic or elastomeric material. The support bracket 110 and the receiver 150 may be formed of different materials or the same material. The support bracket 110 is preferably formed from a material having a high coefficient of friction as compared to bare metal, painted metal or other glossy finish materials. A preferred support bracket 110 material is a resilient silicone elastomeric material that provides frictional engagement of the support bracket 110 at a desired position on a microphone stand.

Figure 7:
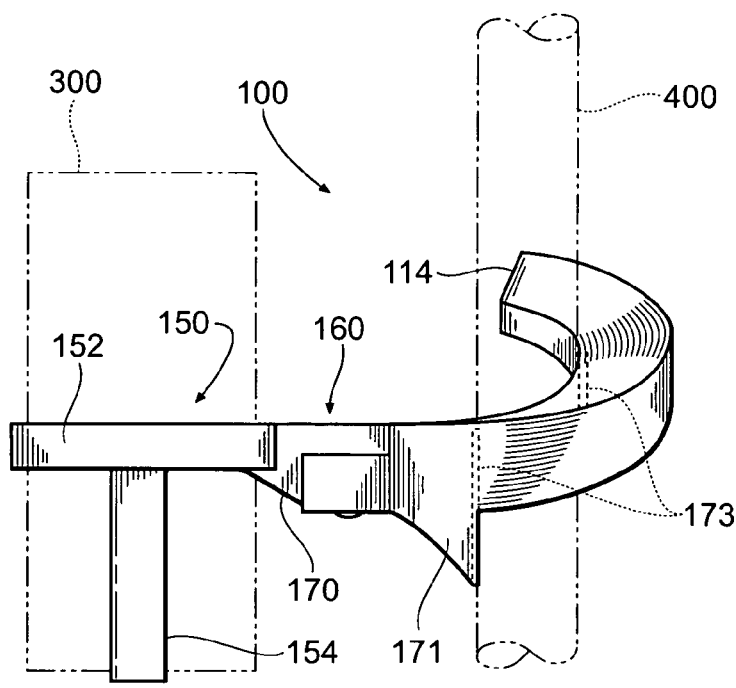
FIG. 7 is a right elevation view of a second embodiment of an apparatus for securing items to a microphone stand.

FIG. 7 is a right elevation view of a second embodiment of an apparatus for securing items to a microphone stand. In this embodiment, an enlarged moment resisting portion 171 is provided proximal to the microphone stand 400, in order to support the support bracket 110, as shown. To removably couple the receiver 150, the support bracket 110 and receiver hitch mechanism 160 in a substantially horizontal position. Additionally, tabs 173 can be provided interiorly and in intended contact with the microphone stand 400. Tabs 173 can be formed with an adhesive material, or a material resistant to slipping, in order to provide somewhat of a gripping function between the device 100 and the microphone stand 400. As shown in this embodiment of the device 100, the frame member 112 of the support bracket 110 need not extend entirely around the circumference of the microphone stand 400, the frame member 112 of the support bracket 110 can extend less than or greater than one entire circumference of the microphone stand 400.

Figure 4:
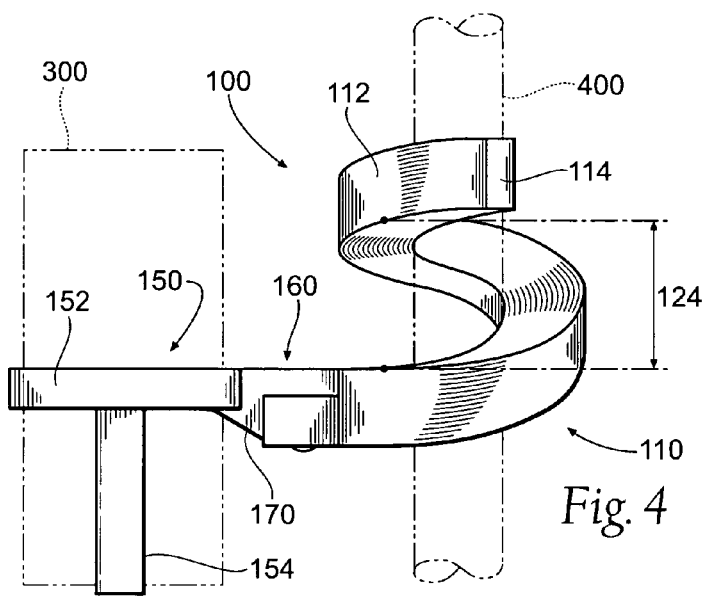
FIG. 4 is a right elevation view of the first embodiment of FIG. 1.
Figure 8:
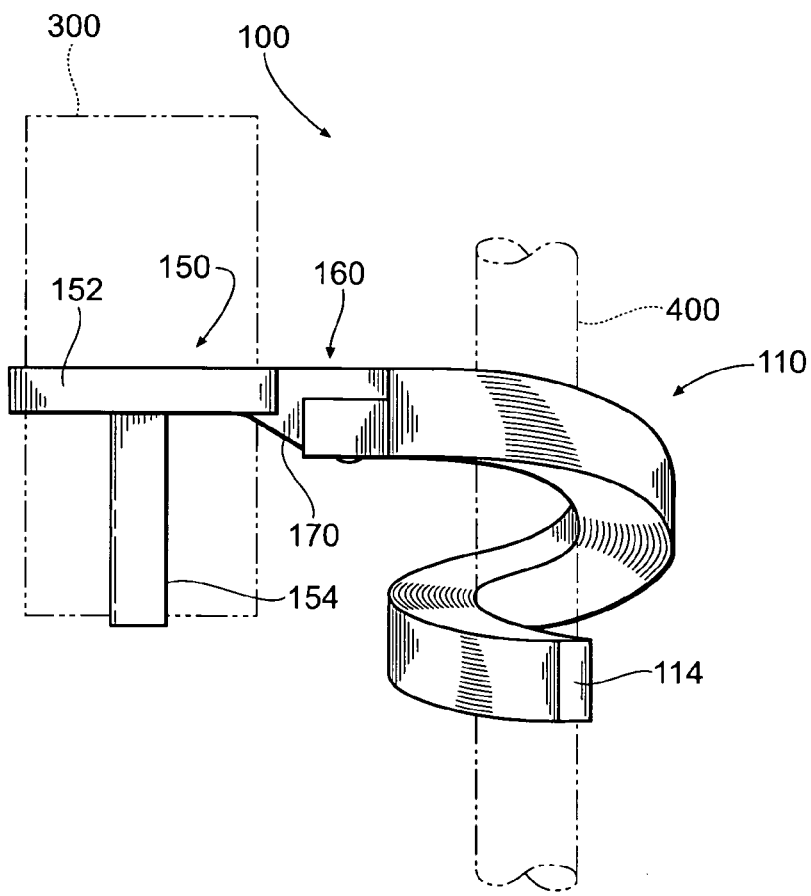
FIG. 8 is a right elevation view of a third embodiment of an apparatus for securing items to a microphone stand.

Referring now to FIG. 8, a right elevation view of a third embodiment of an apparatus for securing items to a microphone stand is shown. In most senses, the embodiment of FIG. 8 is similar to that of FIG. 4, except that the frame member 112 of the support bracket 110 is shown extending radially below the general level of the receiver 150, the support bracket 110 and receiver hitch mechanism 160. The preferably flexible nature of the frame member 112 of the support bracket 110 would allow for either upwardly (FIG. 4) or downwardly (FIG. 8) spiraling deployment of the frame member 112 of the support bracket 110.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A device comprising:
   a support bracket, said support bracket including a longitudinal frame member extending between a first end and a second end, said longitudinal frame member being formed in a general coil shape at least partially around an axis;
   a first frame portion extending from said first end towards said second end;
   a second frame portion extending from said second end towards said first end;
   said first frame portion overlying said second frame portion, and said first frame portion spaced from said second frame portion by an insertion gap distance at a point along said first frame portion; and
   a receiver coupled to said support bracket, said receiver extending away from said axis;
   said longitudinal frame member being hollow.

2. A device comprising:
   a support bracket, said support bracket including a longitudinal frame member extending between a first end and a second end, said longitudinal frame member being formed in a general coil shape at least partially around an axis;
   a first frame portion extending from said first end towards said second end;
   a second frame portion extending from said second end towards said first end;
   said first frame portion overlying said second frame portion, and said first frame portion spaced from said second frame portion by an insertion gap distance at a point along said first frame portion; and
   a receiver coupled to said support bracket, said receiver extending away from said axis;
   said longitudinal frame member having a generally rectangular cross-section.

3. A device comprising:
   a support bracket, said support bracket including a longitudinal frame member extending between a first end and a second end, said longitudinal frame member being formed in a general coil shape at least partially around an axis;
   a first frame portion extending from said first end towards said second end;
   a second frame portion extending from said second end towards said first end;
   said first frame portion overlying said second frame portion, and said first frame portion spaced from said second frame portion by an insertion gap distance at a point along said first frame portion; and
   a receiver coupled to said support bracket, said receiver extending away from said axis;
   said device further including an opening formed about said axis;
   said opening being generally circular in a cross-section shape and having a diameter;
   said first frame portion spaced from said second frame portion by an insertion gap distance at a point along said first frame portion, said insertion gap distance falling within a range
   from said diameter of said opening minus twenty percent of said diameter of said opening,
   to said diameter of said opening plus twenty percent of said diameter of said opening.

4. A device according to claim 3, said insertion gap distance being substantially equal to the diameter of the opening.

* * * * *